TAPE TRANSPORT MECHANISM

Filed Feb. 23, 1968 3 Sheets-Sheet 1

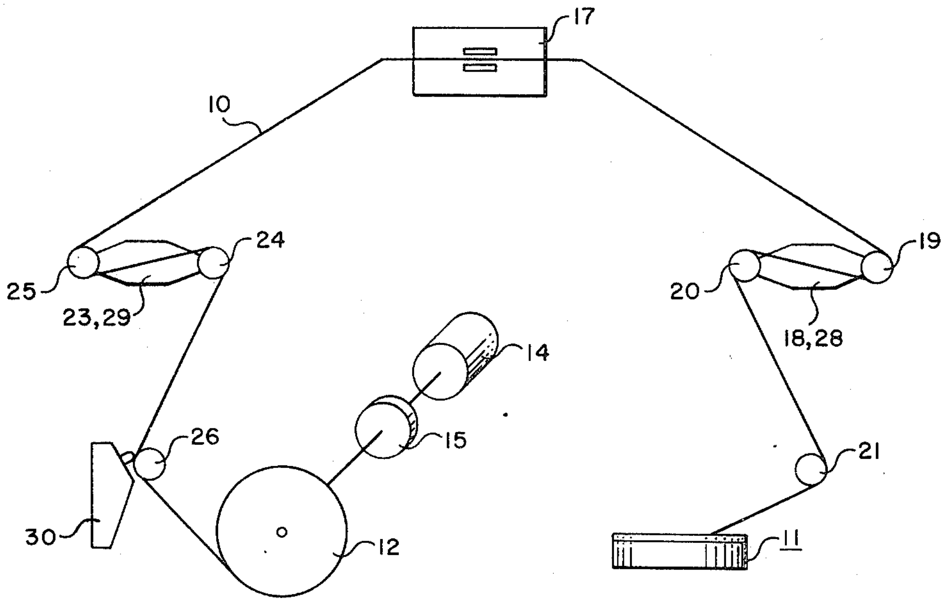
FIG. 2 STANDBY MODE
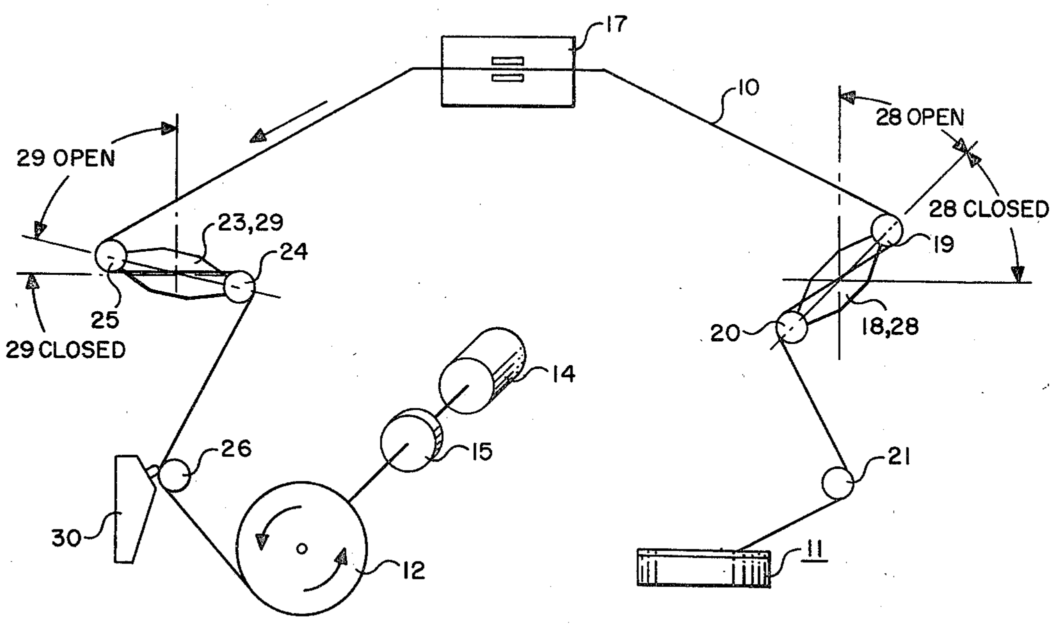
FIG. 3 NORMAL FORWARD STEPPING OF READER Feb. 17, 1970 I. FISNAR 3,495,790
TAPE TRANSPORT MECHANISM
Filed Feb. 23, 1968 3 Sheets-Sheet 3
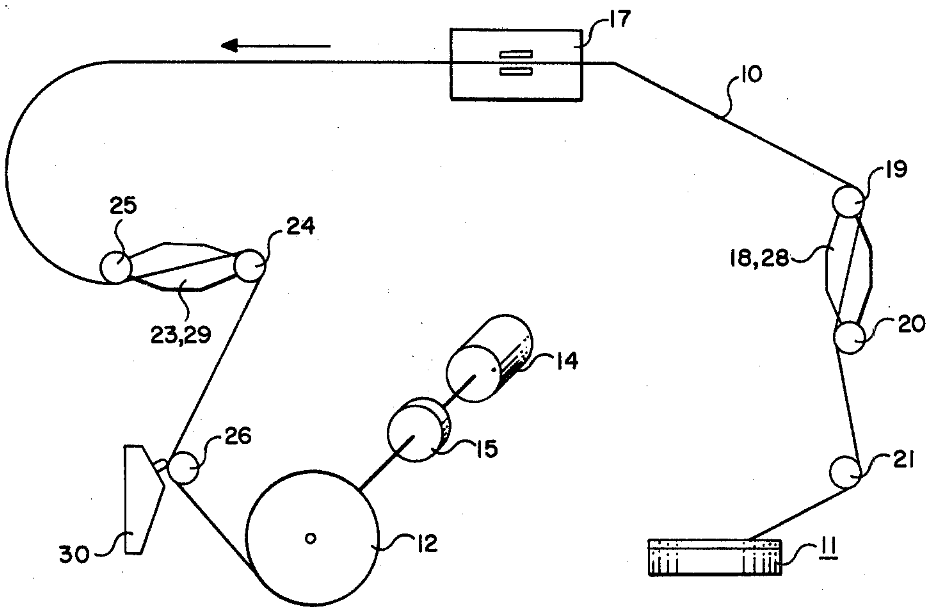
FIG. 4 RAPID FORWARD ADVANCE
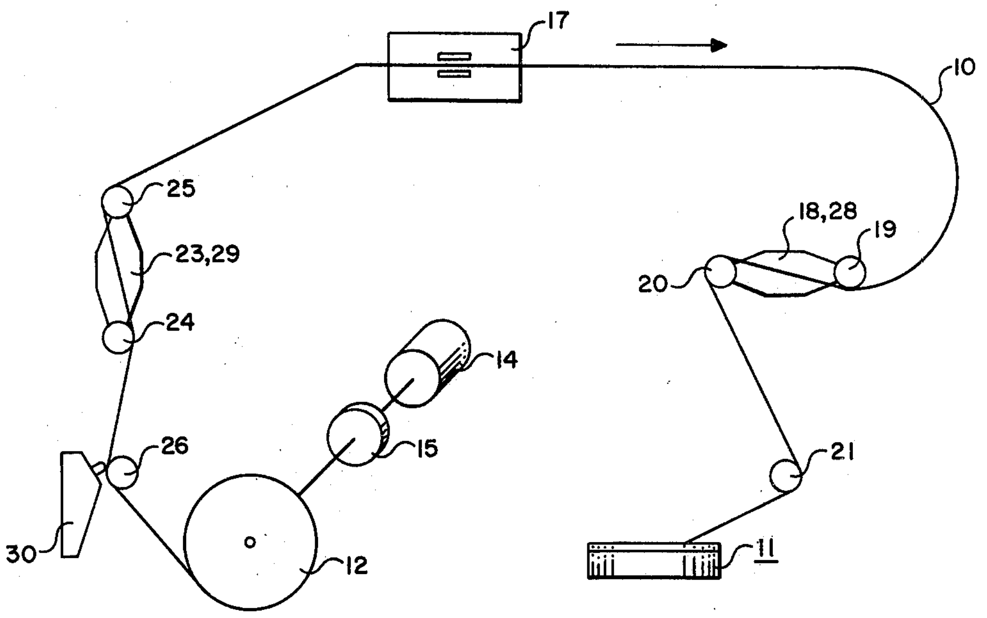
FIG. 5 RAPID REVERSE MODE United States Patent Office 3,495,790
Patented Feb. 17, 1970

3,495,790
TAPE TRANSPORT MECHANISM

Igor Fisnar, Bayside, N.Y., assignor to Fairchild Camera and Instrument Corporation, a corporation of Delaware Filed Feb. 23, 1968, Ser. No. 707,731
Int. Cl. B65h 17/02, 23/16; G03b 1/28
U.S. Cl. 242—67.4 7 Claims

ABSTRACT OF THE DISCLOSURE

An intermittent fast-slow reversible punched-tape transport mechanism comprises a rotatable tape-roll supply carriage, a rotatable tape takeup spool, a slip clutch, and an intermittently operating driving motor for driving the takeup spool through the clutch. A reversible tape-reading and driving mechanism for the tape includes a separate motor and is effective to supply tape to the takeup spool in a slow forward movement during reading, with intermittent fast forward and reverse movements for measuring the duration of the groups of information holes and the spaces between the groups. The mechanism further comprises a pivoted buffer arm carrying a guide roll at each end thereof and disposed to receive and guide a tape from the supply roll and supply it to the reading mechanism. This arm is biased to a normal position, forming a double loop in the tape between the supply roll and the reading mechanism, the buffer arm having a moment of inertia about its pivot which is a small fraction of that of the tape-roll supply carriage. The mechanism further includes a second pivoted buffer arm of the same character, disposed to receive and guide a tape from the reading mechanism to the takeup spool. With this arrangement, during fast forward movement of the tape, tape is supplied to the reading mechanism, at least in part, from the double loop by the pivotal movement of the buffer arm under tension of the tape. The second pivoted buffer arm performs a similar function for fast reverse movement of the tape. The mechanism includes a normally-closed switch associated with each of the buffer arms and actuated to open position upon predetermined pivotal movement from its normal position. These switches are connected in series in the circuit of the driving motor to disable it under such conditions.

CROSS-REFERENCE

The strip-transport mechanism of the invention is particularly adapted for transporting punched tape which supplies information to, and controls, a phototypesetter of the type described and claimed in United States Patent No. 3,434,402, issued Mar. 25, 1969, to John M. McCall, entitled "Turret-Font Photocomposing Machine" and assigned to the same assignee as the present invention.

BACKGROUND OF THE INVENTION

While the invention has a wide range of applications, it is particularly suitable for use in transporting a punched paper tape through a tape reader which drives the tape and has intermittent fast-slow reversible operation, while maintaining tension on the tape at a minimum under extreme conditions of acceleration and deceleration of the tape, for example from 0 to 300 lines of holes or codes per second, or vice versa.

In many tape and film transport mechanisms, the strip is normally advanced relatively slowly during the portion of the cycle in which information is read from the strip and utilized in the machine with which it is associated. However, in certain tape-controlled machines, the code information often occurs in spaced groups, the spaces between the groups being utilized for other machine functions. In order to conserve time, it is desirable to advance the tape rapidly during such spaces. Moreover, in certain machines, for example, the machine described and claimed in aforesaid Patent No. 3,434,402, the duration of each group of information holes or codes is measured and fed to the machine before reading out such information for normal utilization. Again in order to conserve time, it is desirable to advance and reverse the tape rapidly during this measurement portion of the cycle.

No intermitten fast-slow reversible strip-transport mechanisms have heretofore been available which accomplish the foregoing functions and, in fact, the presently available strip-transport mechanisms performing only certain of such functions are relatively complex and costly.

It is an object of the invention, therefore, to provide a new and improved intermittent fast-slow reversible strip-transport mechanism which is simple and inexpensive in construction and which will accomplish one or more of the foregoing desired functions.

SUMMARY OF THE INVENTION

In accordance with the invention, there is provided an intermittent fast-slow reversible strip-transport mechanism comprising a rotatable strip takeup spool, a slip clutch, and an intermittently operating driving means for driving the takeup spool through the clutch The mechanism also comprises a reversible strip-advancing mechanism effective normally to supply strip to the takeup spool in a slow forward movement with intermittent fast reverse movements, and a pivoted buffer arm including a guide roll at each end thereof disposed to receive and guide a strip from the strip-advancing mechanism to the takeup spool, biased to a normal position forming a double loop in the strip between the advancing mechanism and the spool, and having a moment of inertia about its pivot which is a small fraction of that of the takeup spool and its connected elements, whereby, upon fast reverse movement of the strip, strip is supplied to the advancing mechanism at least in part by pivotal movement of the buffer arm under tension of the strip. The term "roll" or "guide roll" is used herein and in the appended claims to refer either to a post of low-friction material such as polytetrafluoroethylene or to a roller supported on an anti-friction bearing. The term "normal position," as applied to the buffer arms, is used herein and in the appended claims to refer to the position of the arm when there is no movement of a strip through the mechanism. The term "spool and connected elements" is used herein and in the appended claims to include all elements movable therewith, including a strip roll mounted thereon.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENT

Figure 1:
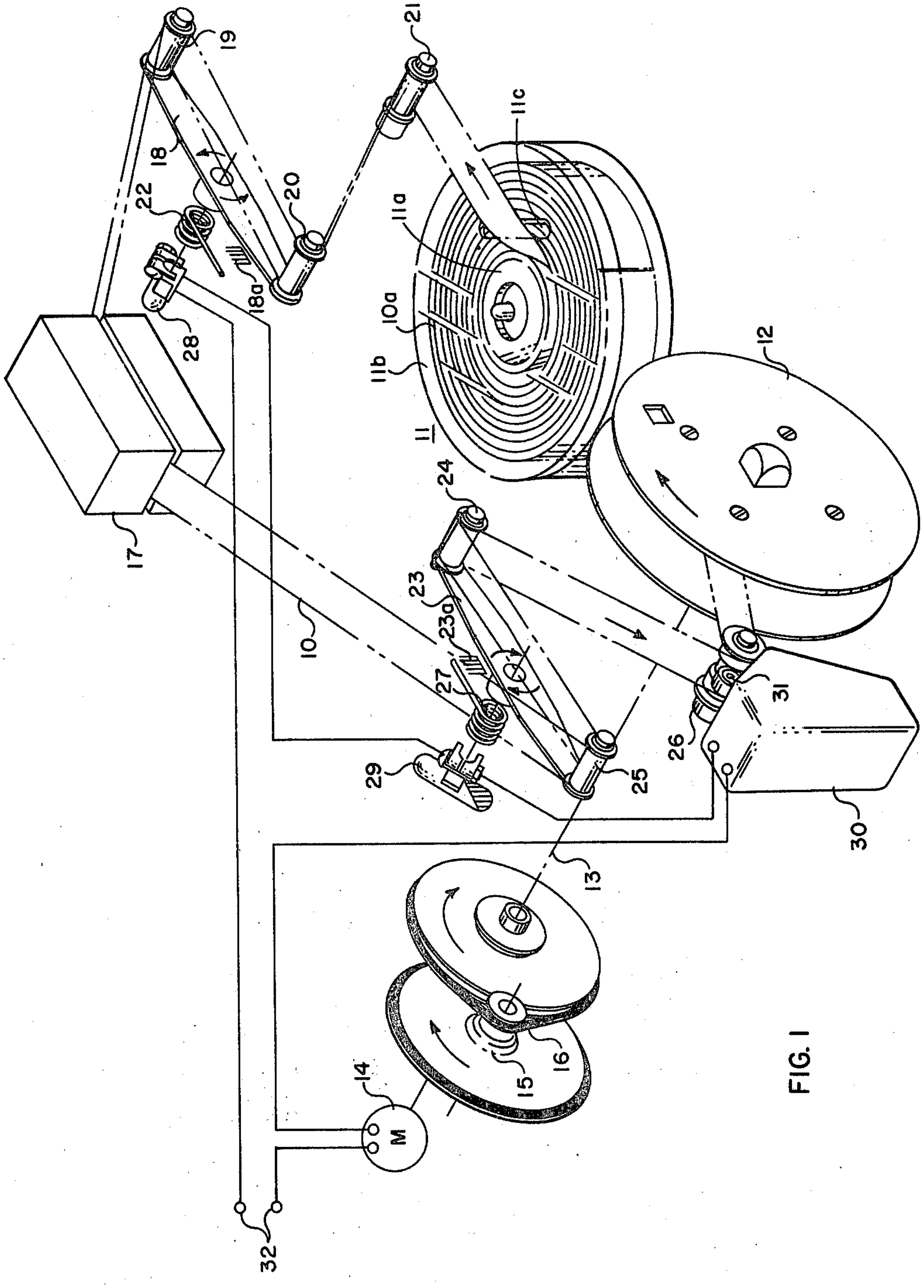
FIG. 1 is an exploded perspective view, partially schematic, of an intermittent fast-slow reversible punched-tape transport mechanism embodying the invention, while FIGS. 2 to 5, inclusive, are schematic diagrams of the apparatus of FIG. 1 during the several phases of its operating cycle to aid in explanation of the invention.

Referring now to FIG. 1, there is represented an intermittent fast-slow reversible strip-transport mechanism, specifically for transporting a punched paper tape 10. This mechanism includes a rotatable strip or tape-roll supply carriage 11 of the type in which the strip is fed out from the center of the roll. The roll of tape 10*a* is disposed on a hub 11*a* and enclosed in a plastic housing 11*b* having an exit slot 11*c* from which the tape 10 emerges. The mechanism further includes a rotatable strip-takeup spool 12 mounted on a shaft indicated schematically at 13 and having an intermittently operating driving means, such as a motor 14, driving the shaft 13 through a slip clutch 15 and a speed-reducing pulley and belt arrangement 16. The tape 10 passes through a reversible strip-advancing mechanism such as a tape-reading mechanism 17, which normally advances or withdraws the tape 10 from the supply roll 10*a*. The tape-reading mechanism 17 may be entirely conventional and is shown schematically. It is normally provided with a driving motor (not shown) separate from the motor 14. As previously stated, the reading mechanism 17 is effective normally to withdraw the tape 10 from the roll 10*a* and to supply it to the takeup spool 12 in a slow forward movement during reading, with intermittent fast forward and reverse movements for measuring the duration of groups of information code holes and the spaces therebetween.

The strip-transport mechanism of FIG. 1 further comprises a pivoted buffer arm 18 including guide rolls 19 and 20 at either end thereof and disposed to receive and guide a tape 10 from the supply roll 10*a* via an idler roll 21 and to supply it to the tape-reading and advancing mechanism 17. The arm 18 is biased by a spring 22 to a normal position against a stop 18*a* in which it forms a double loop in the tape between the supply carriage 11 and the tape-reading mechanism 17, as shown. The moment of inertia of the arm 18 about its pivot, together with the elements associated with and moving therewith, is only a small fraction of that of the rotatable tape roll 10*a*.

The strip-transport mechanism of FIG. 1 further comprises a second pivoted buffer arm 23 including guide rolls 24 and 25 at either end thereof disposed to receive and guide the tape 10 emerging from the reading mechanism 17 to the takeup spool 12 via an intermediate roll 26, to be described. It will be noted that the pivoted arm 23 also is biased by a spring 27 to a normal position against a stop 23*a* in which it forms a double loop in the tape 10 between the reading mechanism 17 and the takeup spool 12. The buffer arm 23, like the arm 18, has, with all elements associated and movable therewith, a moment of inertia about its pivot which is a small fraction of that of the takeup spool 12 and its connected elements.

Associated with the pivoted buffer arms 18 and 23 are electric switches 28 and 29, respectively, which may be of the mercury pool type and of the normally-closed type, that is, closed during no movement of the tape 10 through the mechanism, but actuated to open position by their respective buffer arms upon predetermined pivotal movement from their respective normal positions.

The strip-transport mechanism of FIG. 1 further comprises means for sensing the passage of the end of the strip or tape 10 through the mechanism for disabling the driving means, specifically for deenergizing the motor 14. This means may be in the form of a microswitch 30 having a feeler 31 which senses the presence of the tape 10 on the roll 26, which has a central portion of reduced radius so that, when the end of the tape passes the roll 26, the normally-closed switch 30 is opened. As shown in FIG. 1, the motor 14 is energized from supply terminals 32 in series with the switches 28, 29, and 30 so that the opening of any of these three switches deenergizes the motor, stopping the takeup spool 12.

The operation of the strip-transport mechanism of FIG. 1 may be explained by reference to FIGS. 2 to 5, inclusive, which are schematic diagrams of the positions of the several parts during different modes of operation, corresponding component elements being identified by the same reference numerals. FIG. 2 illustrates the standby mode in which the tape-reading mechanism 17 is idle, the switches 28, 29, and 30 are closed, the motor 14 is running with the clutch 15 slipping, so that the takeup spool 12 is stationary.

FIG. 3 represents the normal forward stepping of the tape-reading mechanism 17, the tape 10 advancing from right to left, as indicated, the reading mechanism 17 withdrawing tape 10 from the supply carriage 11, the tension on the tape 10 pivoting the buffer arm 18, as indicated, but not to the extent required to open its associated switch 28. At the same time, the motor 14 drives the takeup spool 12 through the clutch 15, exerting a slight tension on the tape 10 so that the buffer arm 23 is pivoted slightly, but by an insufficient amount to open its associated switch 29. The switch 30 is also closed, due to the presence of the tape on the roll 26. This represents the normal operation of the transport mechanism during which the tape 10 is read in the mechanism 17. In FIG. 3 are indicated the angular movements of the buffer arms 18 and 23 which are effective to open their respective switches.

FIG. 4 represents the portion of the operating cycle in which the tape 10 is rapidly advanced forward by the reading mechanism 17, as when sensing a space between groups of information code holes. Under these conditions, the tape 10 is advanced more rapidly than it can be supplied by the supply spool carriage 11 but the deficiency is made up from the double loop (FIG. 2) by rotation of the buffer arm 18, the dimensions of the arm 18 and its degree of angular movement being such as to supply tape of a length equal to the greatest spacing between groups of information code holes. Under these conditions, the switch 28 is open, deenergizing the motor 14 and stopping the takeup spool 12 so that the tape 10 between the reading mechanism 17 and the buffer arm 23 forms a slack loop, as indicated. This portion of the cycle may represent either the sensing of a space by the reading mechanism 17 or by a fast advance of the tape for measurement purposes, as described above.

FIG. 5 represents conditions during which the tape 10 is driven by the reading mechanism 17 rapidly in a reverse direction, a portion of the cycle during which the measurement of the duration of the information code holes is actually made. Again, the rate of reversal of the tape 10 by the reading mechanism 17 is so great that it could not, in any event, overcome the momentum of the takeup spool 12 and reverse its direction. Consequently, during this portion of the cycle, the tape 10 is supplied to the reading mechanism 17 from the slack loop shown in FIG. 4. Since, during this portion of the cycle, there is no tension on the tape 10 tending to withdraw it from the supply carriage 11, a slack loop is formed between the reading mechanism 17 and the buffer arm 18, as indicated. Also, the switch 29 is opened by the extreme angular movement of the buffer arm 23 so that the motor 14 is deenergized and the takeup spool 12 is stationary.

While the parameters of the tape-transport mechanism of the invention may vary over a wide range, depending upon the characteristics of the tape, tape reader, and takeup and feed spools, there follow one set of parameters of the pivoted buffer arm mechanisms which have been found satisfactory in one physical embodiment of the invention:

| | |
|---|---|
| Buffer arms **18**, **23**—moment of inertia ounce-inch-second$^2$ | $7000\times10^{-6}$ |
| Buffer arm **18**—torque ______inch-ounces | 40 |
| Buffer arm **23**—torque ___________do | 11 |
| Slip clutch **15**—torque ___________do | 8 |

Thus it is seen that the tape-transport mechanism described has a number of characteristics which are advantageous. Among these are the following:

(1) The supply carriage 11 accepts a so-called "reverse wound" roll of tape 10*a*, that is, the leading edge of the tape is at the center of the roll. This is, of course, the way in which the roll is formed on the takeup spool 12 so that a complete roll of tape, as finally wound on the spool 12, can be re-used without rewinding.

(2) The bidirectional operation of the transport, permitting limited rapid forward movement and limited rapid reverse movement, facilitates rapid movement over the spaces between groups of information code holes and also permits the rapid measurement of each particular group of information code holes. A transport mechanism constructed in accordance with the present invention provided reverse movement of approximately three feet.

(3) At all times, there is a minimum strain on the tape-reading mechanism 17 and on the tape itself, in spite of extreme conditions of acceleration of the tape from 0 speed up to as much as 300 rows of code holes per second, this being the result of the extremely small moment of inertia of the pivoted buffer arms 18 and 23.

(4) At all portions of the cycle during which the tape 10 is rewound on the takeup spool 12, substantially uniform tension is maintained in the tape 10, such tension being determined primarily by the bias spring 27.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An intermittent fast-slow reversible strip-transport mechanism comprising:

a rotatable strip takeup spool;
a slip clutch;
an intermittently operating driving means for driving said spool through said clutch;
a reversible strip-advancing mechanism effective normally to supply strip to said spool in a slow forward movement with intermittent fast reverse movements;
and a pivoted buffer arm including a guide roll at each end thereof disposed to receive and guide a strip from said advancing mechanism to said spool, biased to a normal position forming a double loop in the strip between said advancing mechanism and said spool, and having a moment of inertia about its pivot which is a small fraction of that of said spool and its connected elements,
whereby, upon fast reverse movement of the strip, strip is supplied to said advancing mechanism at least in part by pivotal movement of said buffer arm under tension of said strip.

2. A strip-transport mechanism in accordance with claim 1 in which said advancing mechanism is effective also to impart intermittent fast forward movement to the strip.

3. A strip-transport mechanism in accordance with claim 1 which includes a normally-closed switch actuated to open position by said buffer arm upon predetermined pivotal movement from its normal position and circuit means responsive to opening of said switch for disabling said driving means.

4. A strip-transport mechanism in accordance with claim 1 which includes means for sensing the passage of the end of strip through the mechanism for disabling said driving means.

5. A strip-transport mechanism in accordance with claim 4 in which said sensing means includes an idler roll over which the strip passes and a microswitch including a feeler engaging the strip on said idler roll.

6. A strip-transport mechanism in accordance with claim 2 including:

a rotatable strip-roll supply carriage,
and a second pivoted buffer arm including a guide roll at each end thereof disposed to receive and guide a strip from said carriage and supply the same to said advancing mechanism, biased to a normal position forming a double loop in the strip between said carriage and said advancing mechanism, and having a moment of inertia about its pivot which is a small fraction of that of said carriage,
whereby, during fast forward movement of a strip by said advancing mechanism, strip is supplied to said advancing mechanism at least in part by pivotal movement of said second buffer arm under tension of the strip.

7. A strip-transport mechanism in accordance with claim 6 which includes a second normally-closed switch actuated to open position by said buffer arm upon predetermined pivotal movement from its normal position and circuit means responsive to opening of said switch for disabling said driving means.

References Cited

UNITED STATES PATENTS

| | | | |
|---|---|---|---|
| 2,578,123 | 12/1951 | Bendfelt | 242—75.3 |
| 2,589,660 | 3/1952 | Bauman et al. | 242—55.12 |
| 2,676,212 | 4/1954 | Williams | 242—55.12 X |
| 2,685,417 | 8/1954 | Bartelson | 242—75.3 |
| 2,959,369 | 11/1960 | House | 242—55.12 |

LEONARD D. CHRISTIAN, Primary Examiner

U.S. Cl. X.R.

226—60; 242—75.3